US010700322B2

United States Patent
Karulkar et al.

(10) Patent No.: US 10,700,322 B2
(45) Date of Patent: Jun. 30, 2020

(54) CONSOLIDATED FILL PORT PLUG AND SAFETY VENT FOR BATTERY APPLICATIONS

(71) Applicant: FORD GLOBAL TECHNOLOGIES, LLC, Dearborn, MI (US)

(72) Inventors: Mohan Karulkar, Dearborn, MI (US); Brian Joseph Robert, St. Clair Shores, MI (US); Andrew Robert Drews, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 15/474,472

(22) Filed: Mar. 30, 2017

(65) Prior Publication Data

US 2018/0287117 A1  Oct. 4, 2018

(51) Int. Cl.
*H01M 2/12* (2006.01)
*H01M 2/36* (2006.01)

(52) U.S. Cl.
CPC ....... *H01M 2/1241* (2013.01); *H01M 2/1205* (2013.01); *H01M 2/365* (2013.01); *H01M 2200/00* (2013.01); *H01M 2200/10* (2013.01); *H01M 2200/20* (2013.01); *H01M 2220/20* (2013.01)

(58) Field of Classification Search
CPC .. H01M 2/1241; H01M 2/1205; H01M 2/365; H01M 2200/00; H01M 2200/10; H01M 2220/20; H01M 2200/20
See application file for complete search history.

(56) References Cited

U.S. PATENT DOCUMENTS

| | | | | |
|---|---|---|---|---|
| 4,397,919 | A * | 8/1983 | Ballard | H01M 2/0232 429/53 |
| 5,993,991 | A * | 11/1999 | Jones | H01M 2/1205 429/163 |
| 8,734,983 | B2 | 5/2014 | Kaun | |
| 2008/0102366 | A1* | 5/2008 | Anglin | H01M 2/0235 429/174 |
| 2013/0095363 | A1* | 4/2013 | Yong | H01M 2/0473 429/120 |
| 2016/0020452 | A1 | 1/2016 | Choi et al. | |

FOREIGN PATENT DOCUMENTS

DE   102013108712 A1   2/2015

* cited by examiner

*Primary Examiner* — Lisa S Park
(74) *Attorney, Agent, or Firm* — David B. Kelley; Brooks Kushman P.C.

(57) ABSTRACT

A plug for a fill port of a battery cell includes a body defining a channel. The plug includes a cover coupled to the body and covering the channel. The cover is configured to open in response to predetermined conditions to vent the battery cell.

14 Claims, 3 Drawing Sheets

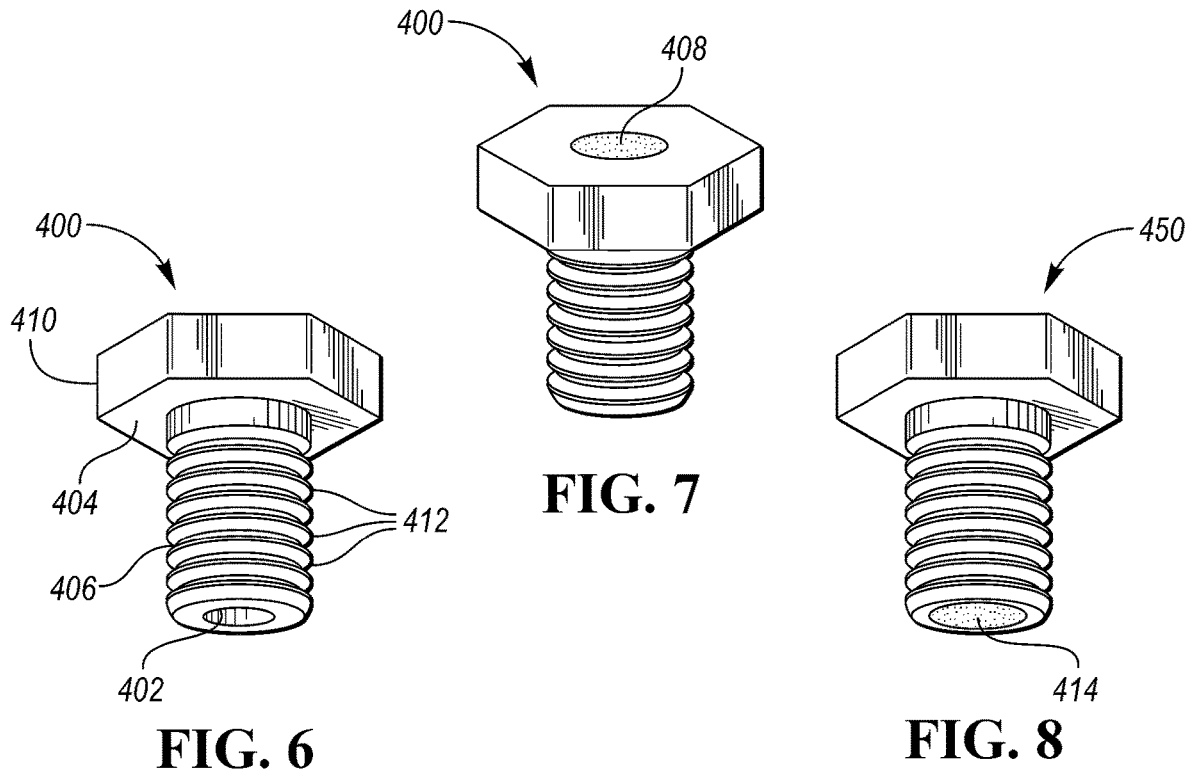
FIG. 6
FIG. 7
FIG. 8
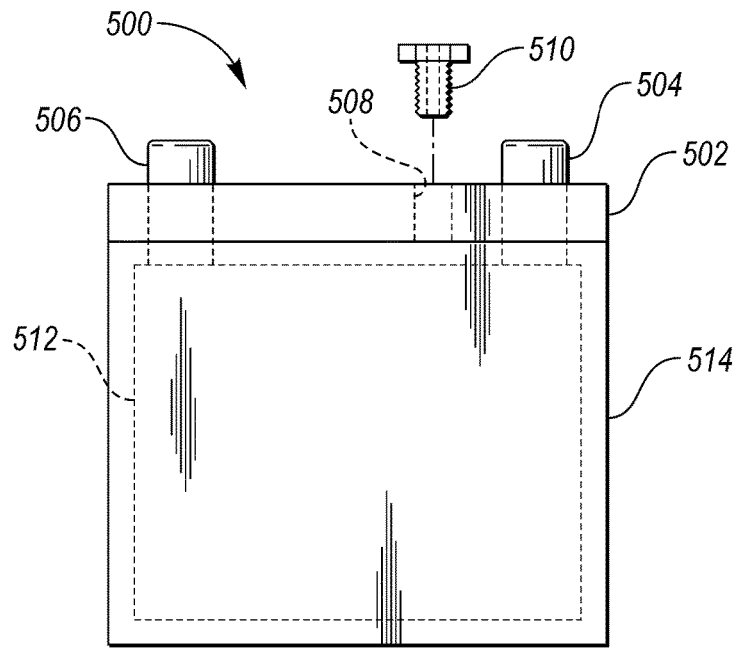
FIG. 9

CONSOLIDATED FILL PORT PLUG AND SAFETY VENT FOR BATTERY APPLICATIONS

TECHNICAL FIELD

This application generally relates to battery cell venting and sealing.

BACKGROUND

A battery pack may be used to power an electrified vehicle. The battery pack is comprised of battery cells arranged in series and/or parallel. The battery cells are manufactured and assembled in the battery pack. During manufacturing, the battery cells are filled with liquid electrolytes. During operation, gases may be created within the battery cells. As such, sealing and venting of the battery cells present challenges for the design of the battery cells.

SUMMARY

A battery cell includes a header defining an opening for filling the battery cell with electrolyte. The battery cell further includes a plug, inserted in the opening, defining a channel between an interior of the battery cell and an exterior of the battery cell and including a cover disposed across the channel configured to open in response to predetermined conditions to vent the battery cell.

The predetermined conditions may include a pressure in the interior of the battery cell exceeding a predetermined pressure. The predetermined conditions may include a temperature of the plug exceeding a predetermined temperature. The predetermined conditions may include contact over a predetermined duration with a byproduct of electrolyte degradation in the battery cell that corrodes the cover. The cover may be a metal foil. The cover may be a plastic layer. The cover may be disposed across the channel on a surface of the plug that is adjacent the exterior of the battery cell. The cover may be disposed across the channel on a surface of the plug that is adjacent the interior of the battery cell.

A plug for a fill port of a battery cell includes a head coupled to a shaft, wherein the head and shaft define a channel extending from a first end associated with the head to a second end associated with the shaft. The plug includes a cover disposed across the channel and configured to open in response to predetermined conditions to vent the battery cell.

The shaft may be threaded. A cross sectional area of the head may be greater than a cross sectional area of the shaft. The shaft may be barbed for one-time insertion. The predetermined conditions may include a pressure difference across the cover exceeding a predetermined pressure difference. The predetermined conditions may include a temperature of the cover exceeding a predetermined temperature. The cover may be a metal foil. The cover may be a plastic layer. The cover may be disposed on the head.

A plug for a fill port of a battery cell includes a body defining a channel therethrough and a thin-film cover, coupled to the body and covering the channel, configured to open in response to a pressure difference across the thin-film cover exceeding a predetermined pressure difference.

The body may be configured to be inserted and removed from an opening. The body may be configured for one-time insertion into an opening.

BRIEF DESCRIPTION OF THE DRAWINGS

FIG. 6 depicts a lower-side view of a second integrated sealing plug/vent port configuration.

FIG. 7 depicts an upper-side view of the second integrated sealing plug/vent port configuration.

FIG. 8. depicts a lower-side view of a variation of the second integrated sealing plug/vent port configuration.

FIG. 9 depicts a diagram of a pouch-type battery cell with an integrated sealing plug/vent port.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
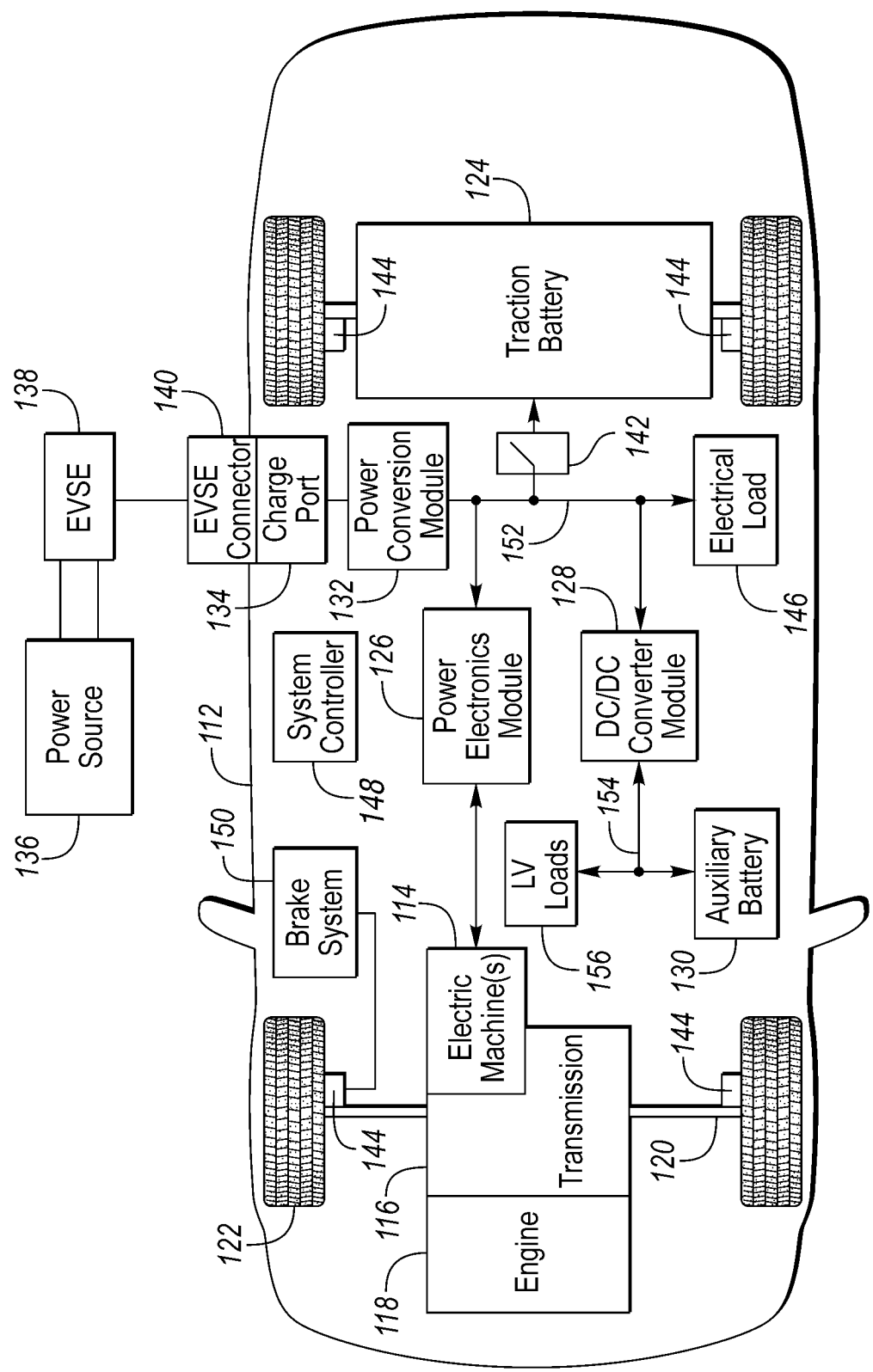
FIG. 1 depicts a possible configuration of vehicle including a traction battery.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability. In other configurations, the vehicle 112 may be a fuel-cell electric vehicle (FCEV).

A battery pack or traction battery 124 stores energy that can be used by the electric machines 114. The traction battery 124 may provide a high voltage direct current (DC)

output. A contactor module 142 may include one or more contactors configured to isolate the traction battery 124 from a high-voltage bus or load bus 152 when opened and connect the traction battery 124 to the high-voltage load bus 152 when closed. The high-voltage load bus 152 may include power and return conductors for carrying current over the high-voltage load bus 152. The contactor module 142 may be located in the traction battery 124. One or more power electronics modules 126 (also known as an inverter) may be electrically coupled to the high-voltage load bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage load bus 152 to a low-voltage DC level of a low-voltage load bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage load bus 154. One or more high-voltage electrical loads 146 may be coupled to the high-voltage load bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage load bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic modules that are present in the vehicle 112. A vehicle system controller (VSC) 148 may be present to coordinate the operation of the various components.

The traction battery 124 may be comprised of a plurality of battery cells. Each of the battery cells has a voltage and current capability. The battery cells may be electrically coupled in series and/or parallel to achieve a desired overall voltage and current capability for the traction battery 124. Active materials in the battery cells may include Lithium-ion based materials.

Figure 2:
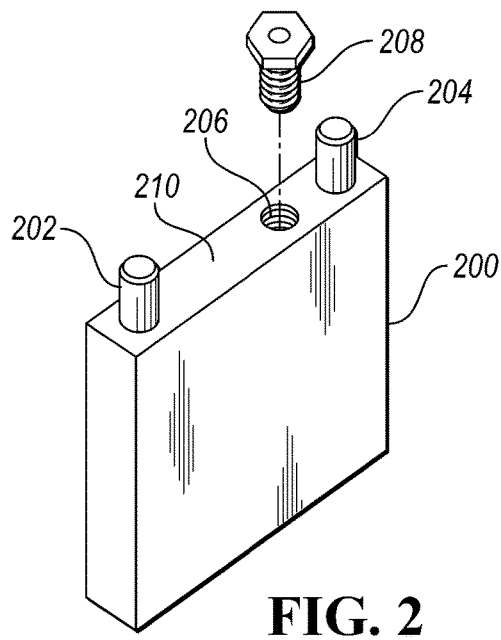
FIG. 2 depicts a diagram of a prismatic battery cell with an integrated sealing plug/venting plug.

FIG. 2 depicts a possible configuration of a prismatic battery cell 200. The prismatic battery cell 200 may include a positive terminal 202 and a negative terminal 204. The prismatic battery cell 200 may be a layered combination of anode, separator, and cathode materials that are housed inside a rigid rectangular housing. The positive terminal 202 and the negative terminal 204 may be coupled to cathode and anode materials respectively. The positive terminal 202 and the negative terminal 204 may allow current to flow in and out of the battery cell. The prismatic battery cell 200 may include a cell header 210 on a side of the prismatic battery cell 200. The cell header 210 may define an opening 206 for filling the cell with electrolyte. The prismatic battery cell 200 may be otherwise sealed at other surfaces that comprise the housing of the prismatic battery cell 200. The cell header 210 may be configured to mount or pass through the positive terminal 202 and the negative terminal 204. The positive terminal 202 and the negative terminal 204 may be configured as posts or tabs extending through cell header 210. In some configurations, the positive terminal 202 and the negative terminal 204 may be conductive patches on the cell header 210. After construction and sealing (except for the opening 206), electrolyte may be delivered through the opening 206 in the cell header 210.

After filling, the opening in the cell header may be permanently sealed with a sealing plug. The battery cell may go through a period referred to as formation or break-in. During formation the battery cell may be operated in a controlled charge/discharge cycle to initiate chemical processes with the cell. Chemical reactions within the battery cell during formation may produce byproduct gases. A battery cell may be designed with a volume such that any gases created during formation remain at low pressures. The prismatic battery cells may further include a vent port integrated in the cell header. The vent port may be a second opening defined in the cell header that is covered by a thin layer of plastic or metal material. The vent port is configured to open when pressure within the battery cell exceeds a predetermined threshold. The predetermined threshold may be indicative of an excess build-up of gases in the battery cell. The design of the cell header represents a significant portion of the cost associated with the battery cell. As such, additional openings and other features contribute to cost and complexity of the cell header. After the fill port is permanently sealed, there is no opportunity for degassing the cell after a break-in period. To compensate for this, prismatic battery cells may be designed with additional internal space to accommodate the unremoved gas.

To eliminate these problems, an integrated sealing plug/vent port 208 may be utilized. The integrated sealing plug/vent port 208 eliminates the inefficiency of separate fill and vent ports. Manufacturing of the cell header is simplified. In some configurations, the integrated sealing plug/vent port 208 can permit degassing of the battery cell after formation. This may enable cell size to be reduced as additional space for accumulated gas may not be needed.

The integrated sealing plug/vent port 208 may be configured to be inserted and retained in the opening 206 of the cell header 210. In some configurations, a top portion of the integrated sealing plug/vent port 208 may protrude from the cell header 210. In some configurations, the top portion of the integrated sealing plug/vent port 208 may be flush with a surface of the cell header 210 when the plug is fully inserted.

Figure 3:
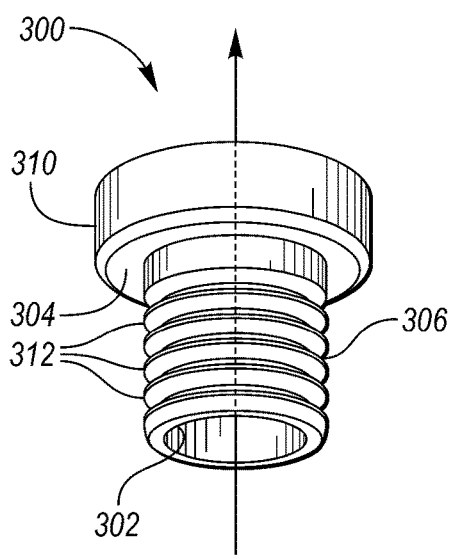
FIG. 3 depicts a lower-side view of a first integrated sealing plug/vent port configuration.
Figure 4:
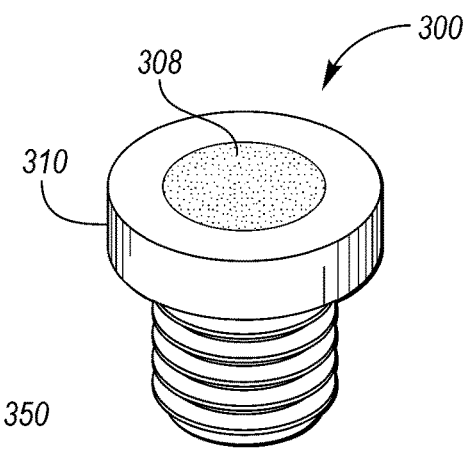
FIG. 4 depicts an upper-side view of the first integrated sealing plug/vent port configuration.

FIG. 3 and FIG. 4 depict different views of a possible configuration of an integrated sealing plug/vent port 300. A body of the integrated sealing plug/vent port 300 may include a head 310 and a shaft 306. The head 310 of the integrated sealing plug/vent port 300 may be round and have a larger cross-sectional area than that of the shaft 306. Other shapes for the head 310 are possible (e.g., hexagonal, square). A cross section of the shaft 306 may be round and sized to fit the within the opening 206. The integrated sealing plug/vent port 300 may include a sealing element 304 that is configured to provide a seal between a lower surface of the head 310 and the cell header 210. The sealing element 304 may be formed of a resilient material such as rubber. In some configurations, the sealing element 304 may be a coating or layer of sealant on an underside of the head 310. In some configurations, the sealing element 304 may be an integral element of the head 310 (e.g., integrated sealing plug/vent port 300 made of resilient material with sealing properties). In some configurations, the head and shaft may have the same cross-sectional area forming a body that may be inserted in the opening such that the head is flush with the cell header.

The integrated sealing plug/vent port 300 may define a channel 302 that extends through the shaft 306 and the head 310. When installed in the opening 206, the integrated sealing plug/vent port 300 may provide a venting path between an interior of the battery cell 200 and an exterior of the battery cell 200. In some configurations, the channel 302 may extend through the entire length of the integrated sealing plug/vent port 300. In such configurations, the channel 302 may extend through the entire length of each of the head 310 and the shaft 306. As such, openings may be defined in the head 310 and the shaft 306. In some configurations, the opening defined in the head 310 may be covered with a vent cover 308. In some configurations, the opening of the channel 302 defined in the shaft 306 may be covered with vent cover. In some configurations, both openings may be covered with a vent cover.

The vent cover 308 is configured to cover and seal the opening. The vent cover 308 may be a thin metal foil or plastic layer that is applied with adhesive to the head 310 of the integrated sealing plug/vent port 300. In some configurations, the vent cover 308 may be a soft material that is inserted into the opening. When the battery cell 200 is sealed, the formation of gas within the battery cell may cause an increase in pressure within the battery cell 200. The vent cover 308 may be configured to open at a predetermined pressure. The vent cover 308 may open in response to pressure difference across the vent cover 308 exceeding a predetermined pressure difference. In some configurations, the vent cover 308 may be configured to open at a predetermined temperature. In some configurations, the vent cover 308 may be configured to open when byproduct solution or gases from within the battery cell 200 contacts the vent cover 308 for a duration greater than a predetermined duration. For example, degradation of the electrolyte may cause an increase in a concentration of hydrofluoric acid (HF) in the battery cell. The vent cover 308 may configured to corrode due to the exposure to the degradation byproduct (e.g. HF). The vent cover 308 may be opened by dissolving, rupturing, tearing, and/or expulsion.

In some configurations, the channel 302 may not extend completely through the integrated sealing plug/vent port 300. The channel 302 may be formed such that a layer of material remains at one end (e.g., surface of the head 310). That is, the vent cover 308 may be integrally formed as part of the integrated sealing plug/vent port 300. For example, a machining or molding process may be configured to leave a thin film to cover the head 310 above where the channel 302 is defined. The thickness of the vent cover 308 may be selected to open at a predetermined pressure, predetermined temperature or predetermined exposure duration.

The shaft 306 may include one or more ridges 312 to aid in holding the integrated sealing plug/vent port 300 in place when inserted in the opening 206. The ridges 312 may be configured to increase the cross section of the shaft 306 such that the combined cross section of the shaft 306 and the ridges 312 is slightly larger than the opening 206. When pushed through the opening 206, the shaft 306 may be configured to deform concentrically to fit the opening 206. The ridges 312 may be flexible and deform as the shaft 306 is inserted in the opening 206. In some configurations, the ridges 312 may be formed as barbs that permit easy insertion into the opening 206 but resist removal of the shaft 306 from the opening 206. The shaft 306, head 310, and ridges 312 may be integrally formed. The channel 302 may be integrally molded or created by removing material (e.g., drilling). The integrated sealing plug/vent port 300 may be constructed of plastic or rubber material. In some configurations, the shaft 306 may be configured as a clip. In a clip configuration, the shaft 306 may be a resilient member that may deform to fit through the opening 206 and, when the clip portion is through the opening 206, expands to engage the surface of the cell header on an inner side of the cell header.

Figure 5:
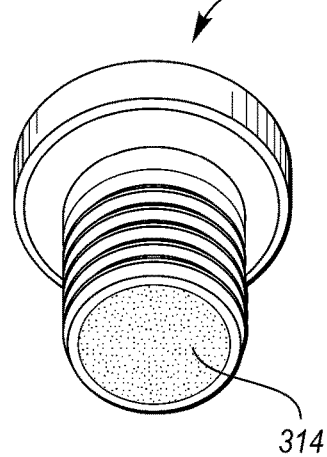
FIG. 5 depicts a lower-side view of a variant of the first integrated sealing plug/vent port configuration.

FIG. 5 depicts an integrated sealing plug/vent port 350 having a vent cover 314 over the opening at an end of the shaft 306. In some configurations, the vent cover 314 may be in addition to the vent cover 308 that covers the opening at the surface of the head 310. This multi-vent cover configuration may prevent some contaminants from entering the battery cell if one of the covers is ruptured. In some configurations, the vent cover 314 may be the only vent cover.

FIG. 6 and FIG. 7 depict different views of a possible configuration for an integrated sealing plug/vent port 400. A body of the integrated sealing plug/vent port 400 may include a head 410 and a shaft 406. The head 410 may be hexagonal shaped and the shaft 406 may have a round cross section. In other configurations, the head 410 may have a different shape (e.g., round, square). The integrated sealing plug/vent port 400 may include a sealing element 404 that is configured to provide a seal between the head 410 and the cell header 210. The sealing element 404 may be formed of a resilient material such as rubber. In some configurations, the sealing element 404 may be a coating or layer of sealant on an underside of the head 410. In some configurations, the sealing element 404 may be an integral element of the head 410 (e.g., integrated sealing plug/vent port 400 made of resilient material with sealing properties).

The integrated sealing plug/vent port 400 may define a channel 402 that extends through the shaft 406 and the head 410. When installed in the opening 206, the integrated sealing plug/vent port 400 may provide a venting path between an interior of the battery cell 200 and an exterior of the battery cell 200. In some configurations, the channel 402 may extend through the entire length of the integrated sealing plug/vent port 400. In such configurations, the channel 402 may extend through the entire length of each of the head 410 and the shaft 406. As such, openings may be defined in the head 410 and the shaft 406. In some configurations, the opening defined in the head 410 may be covered with a vent cover 408. In some configurations, the opening of the channel 402 defined in the shaft 406 may be covered with vent cover. In some configurations, both openings may be covered with a vent cover.

The vent cover 408 is configured to cover and seal the opening. The vent cover 408 may be a thin metal foil or plastic layer that is applied with adhesive to the head 410 of the integrated sealing plug/vent port 400. In some configurations, the vent cover 408 may be a soft material that is inserted into the opening. When the battery cell 200 is sealed, the formation of gas within the battery cell may cause an increase in pressure. The vent cover 408 may be configured to open at a predetermined pressure. The vent cover 408 may open in response to pressure difference across the vent cover 408 exceeding a predetermined pressure different. In some configurations, the vent cover 408 may be configured to open at a predetermined temperature. In some configurations, the vent cover 408 may be configured to open when byproduct solution or gases from within the battery cell 200 contacts the vent cover 408 for a duration greater than a predetermined duration. For example, degradation of the electrolyte may cause an increase in a concentration of hydrofluoric acid (HF) in the battery cell. The vent cover 408 may configured to corrode due to the exposure to the degradation byproduct (e.g. HF). The vent cover 408 may be opened by dissolving, rupturing, tearing, and/or expulsion.

The shaft 406 may be threaded such that rotation in one direction causes the shaft 406 to penetrate further into the opening 206. Likewise, rotation in an opposite direction causes the shaft 406 to withdraw from the opening 206. The threaded shaft 406 permits insertion and removal of the integrated sealing plug/vent port 400. The head 410 may be configured to permit a tool (e.g., wrench, socket) to rotate the shaft 406 to insert or remove the integrated sealing plug/vent port 400. In other configurations, the head 410 may be configured to permit an improved grip on the sides to permit rotation by hand (e.g., rounded head with grooves around the side). The ability to remove the integrated sealing plug/vent port 400 may be useful in certain situations. For example, after a break-in period, the integrated sealing plug/vent port 400 may be temporarily removed to allow degassing. The integrated sealing plug/vent port 400 may then be replaced to seal the battery cell 200.

FIG. 8 depicts an integrated sealing plug/vent port 450 having a vent cover 414 over the opening at an end of the shaft 406. In some configurations, the vent cover 414 may be in addition to the vent cover 408 that covers the opening at the surface of the head 410. This multi-vent cover configuration may prevent some contaminants from entering the battery cell if one of the covers is ruptured. In some configurations, the vent cover 414 may be the only vent cover.

The traction battery 124 may be comprised of a plurality of pouch-type battery cells. The sealed plug with venting can be applied to pouch-type battery cells as well. FIG. 9 depicts a pouch-type battery cell 500. The pouch-type battery cell 500 may include a positive tab 504 and a negative tab 506. The positive tab 504 and the negative tab 506 may be coupled to the battery structure 512. The battery structure 512 may include layers of anode, cathode, and separator materials. The pouch-type battery cell 500 may further include a pouch header 502 that may be formed around the positive tab 504 and the negative tab 506. The pouch header 502 may be configured to easily laminate a pouch material 514 to seal the battery cell. The pouch header 502 may further define an opening 508 for allowing insertion of electrolyte and degassing. An integrated sealing plug/vent port 510 may be inserted in the opening 508 to seal the pouch-type battery cell 500. The integrated sealing plug/vent port 510 may be configured as described previously herein.

The integrated sealing plug/vent port simplifies cell header manufacturing and design and permits degassing of the battery cells. Additionally, ruptured plugs may be replaced with new ones to reseal the battery cell 200 during manufacturing or service visits. The integrated sealing plug/vent port may be configured for one-time insertion or may be configured to be removable.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery cell comprising:
   a header defining an opening for filling the battery cell with electrolyte; and
   a plug, inserted in the opening, defining a channel between an interior of the battery cell and an exterior of the battery cell and including a thin-film cover adhesively applied across the channel and configured to open in response to a pressure in the interior of the battery cell exceeding a predetermined pressure to vent the battery cell.

2. The battery cell of claim 1 wherein the thin-film cover is further configured to open in response to a temperature of the plug exceeding a predetermined temperature.

3. The battery cell of claim 1 wherein the thin-film cover is further configured to open in response to contact over a predetermined duration with a byproduct of electrolyte degradation in the battery cell that corrodes the thin-film cover.

4. The battery cell of claim 1 wherein the thin-film cover is a metal foil.

5. The battery cell of claim 1 wherein the thin-film cover is a plastic layer.

6. The battery cell of claim 1 wherein the thin-film cover is disposed across the channel on a surface of the plug that is adjacent the exterior of the battery cell.

7. The battery cell of claim 1 wherein the thin-film cover is disposed across the channel on a surface of the plug that is adjacent the interior of the battery cell.

8. The battery cell of claim 1 wherein the plug includes a head coupled to a shaft.

9. The battery cell of claim 8 wherein the shaft is threaded.

10. The battery cell of claim 8 wherein a cross sectional area of the head is greater than a cross sectional area of the shaft.

11. The battery cell of claim 8 wherein the shaft is barbed for one-time insertion.

12. The battery cell of claim 8 wherein the thin-film cover is disposed on the head.

13. The battery cell of claim 1 wherein the plug includes a body configured to be inserted and removed from an opening.

14. The battery cell of claim 1 wherein the plug includes a body configured for one-time insertion into an opening.

* * * * *